United States Patent [19]

Hamlet et al.

[11] Patent Number: 4,746,175

[45] Date of Patent: May 24, 1988

[54] DETACHABLE RECEPTACLE AND STRIPPING APPARATUS FOR STRIPPING LAGGING

[76] Inventors: William J. Hamlet, 17 Gleneagles Way, East Hamersley; Gordon S. Hatch, 6 College Road, Gooseberry Hill, both of Australia

[21] Appl. No.: 945,658

[22] PCT Filed: Mar. 13, 1986

[86] PCT No.: PCT/AU86/00065

§ 371 Date: Dec. 22, 1986

§ 102(e) Date: Dec. 22, 1986

[87] PCT Pub. No.: WO86/05431

PCT Pub. Date: Sep. 25, 1986

[30] Foreign Application Priority Data

Mar. 13, 1985 [AU] Australia ............... PG9702

[51] Int. Cl.$^4$ ............................................. B65D 30/2
[52] U.S. Cl. ............................................. 312/1; 312/3
[58] Field of Search ................. 312/1, 3; 383/37, 111

[56] References Cited

U.S. PATENT DOCUMENTS

| | | | |
|---|---|---|---|
| 3,726,329 | 4/1973 | Dean | 383/37 X |
| 3,986,630 | 10/1976 | Catlin | 220/86 |
| 4,185,673 | 1/1980 | Daniello | 383/111 X |
| 4,626,291 | 12/1986 | Natale | 312/3 X |

FOREIGN PATENT DOCUMENTS

| | | |
|---|---|---|
| 159176 | 11/1951 | Australia . |
| 551056 | 3/1983 | Australia . |
| 4338885 | 12/1985 | Australia . |
| 1275683 | 4/1986 | Australia . |
| 1188191 | 6/1985 | Canada . |
| 0130747 | 9/1985 | European Pat. Off. . |
| 8304610 | 8/1983 | Sweden . |
| 1567270 | 5/1980 | United Kingdom ............ 312/1 |
| 2131679 | 6/1984 | United Kingdom . |
| 2157822 | 4/1985 | United Kingdom . |

*Primary Examiner*—Joseph Falk
*Attorney, Agent, or Firm*—Steele, Gould & Fried

[57] ABSTRACT

A detachable bag (13) and shroud (12) which combine to form a stripping apparatus (11) for stripping and collecting fibrous cladding material (27) from a pipe (25). The shroud (12) is adapted to be detachably and sealingly secured to the pipe (25) and the bag (13) is likewise secured to the shroud (12). The bag (13) includes a fastening means (20) to attach an inner envelope (16) thereof to the bottom opening (19b) of the shroud and an outer cover (17) which can be sealingly attached to the outerside of the shroud (12) enclosing the envelope (16) and fastening means (20). The envelope (16) and shroud (12) are each provided with "Velcro" closure strips (21) along their respective inner faces adjacent the fastening means (20) to enable the envelope (16) and shroud (12) to be sealingly closed independently of the other either side of the fastening means (20) to prevent external exposure to the contents of either during attachment and detachment of the bag from the shroud.

15 Claims, 3 Drawing Sheets

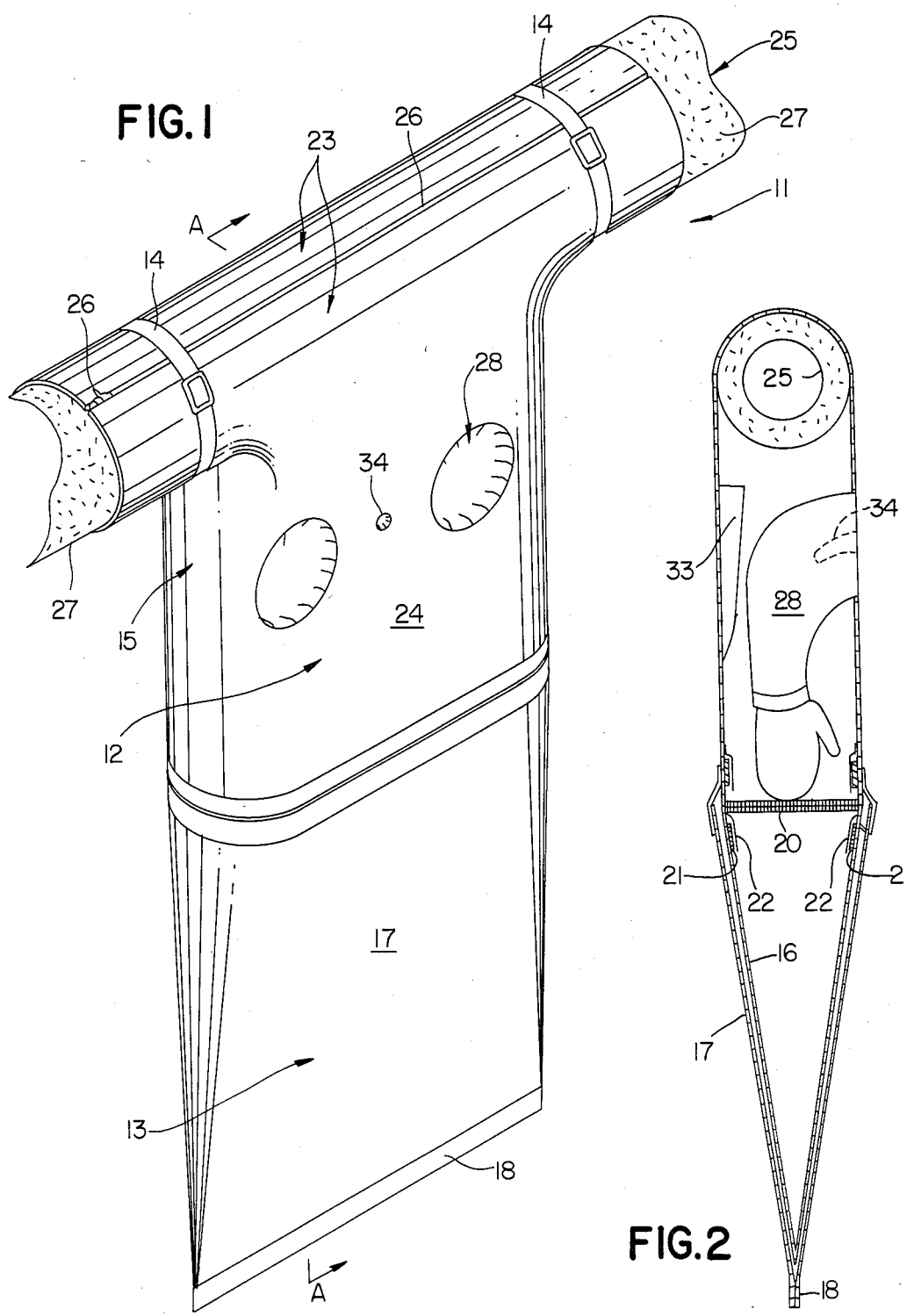

DETACHABLE RECEPTACLE AND STRIPPING APPARATUS FOR STRIPPING LAGGING

BACKGROUND OF THE INVENTION

This invention relates to improvements in or relating to stripping apparatus particularly adapted for stripping fibrous cladding material from a body.

In recent times there has been a growing awareness amongst the public about the dangers involved with the handling of fibrous materials, particularly in the light of the numerous respiratory problems afflicting persons who have worked in an environment containing fibrous materials. This has been highlighted particularly in view of the problems in handling fibrous asbestos material and the relatively high incidence of persons working with the same contracting asbestosis. Unfortunately fibrous materials hazardous to health, such as fibrous asbestos material have been used extensively in the building industry in the past as cladding the lagging materials. As a result of increasing public pressure, it has been necessary for the authorities to insist upon the removal or the melioriation of these materials in areas that pose a possible hazard to the health of persons therein. Consequently, eleborate provisions and regulations have been enforced to control the removal or melioriation of these materials, so as to minimise the risk to persons effecting these operations. As a result, the use of protective apparatus in the form of flexible bags covering a body bearing fibrous material and/or protective clothing in the form of face masks and the like have become mandatory accessories to workmen involved with these operations.

To assist in removing lagging materials from pipes and the like, a detachable bag which sealingly encompasses a section of the pipe has been marketed for several years under the trade mark "Asbebag" in various countries of the world including Australia. This bag is formed with a pair of specially shaped flaps at its open end which are placed about a longitudinal portion of the pipe from opposite sides thereof so as to form a circumscribing sleeve portion about the pipe. A fastening arrangement provided on the meeting edges of the flaps can then be operated to secure the bag to the pipe. The opposite ends of the so formed sleeve portion can then be tied to sealingly engage the bag with the pipe. The bag is also formed with a pair of arm portions which extend inwardly of the bag and which terminate with gloves so that an operator can insert his hands and perform manipulations within the interior of the bag for work on the pipe whilst maintaining isolation between the interior of the bag and the operator's hands. Thus fibrous material can be stripped from the pipe and collected within bag without risking exposure to the stripped fibrous material.

Under the health regulations in Australia it is only practical to use the bag once, whereupon becoming full, it must be removed from the pipe and disposed of without allowing the stripped fibrous material to escape from the bag and come into contact with the operator. Accordingly, it is usually necessary to use several bags to completely strip a pipe covered in lagging. Unfortunately, due to the special shape of the bags, manufacturing costs of the bags are exhorbitant and hence costs in completing a stripping operation can be excessive.

Objects of the Invention It is an object of the present invention to provide a receptacle for use with a stripping apparatus for stripping fibrous cladding material from an elongate body to enable stripped fibrous cladding material to be collected and be disposed of without requiring the removal and disposal of the entire stripping apparatus. It is a preferred object of the invention to provide a receptacle for use with a stripping apparatus for stripping fibrous cladding material from an elongate body to enable stripped fibrous cladding material to be collected, which can be detached from a striping means secured to the body, in a manner such that the collected fibrous material can be maintained in isolation from the operator and the surrounding environment at all times.

SUMMARY OF THE INVENTION

In accordance with one aspect of the present invention, there is provided a detachable receptacle for attachment to a protective stripping means used for stripping fibrous cladding material from an elongate body, said receptacle being adapted to collect said stripped material and comprising: a flexible envelope of substantially impermeable material having an opening to allow for the deposition of said cladding material therein; fastening means to integrally connect the receptacle to a corresponding opening provided on said stripping means when it is secured to said body enabling communication between the envelope and stripping apparatus interior via said openings; envelope closure means provided on said envelope and disposed apart from said fastening means to close the envelope opening and substantially seal the contents of the envelope during attachment or detachment to said apparatus independently of said fastening means; and an outer cover to enclose said envelope so as to facilitate containment of the envelope therein when sealed.

Preferably, the peripheral edge of the outer cover encompassing said envelope is capable of being releasably and sealingly engaged to the outerside of the stipping means.

The envelope closure means preferably comprises envelope closure strips attached to opposing inner faces of the envelope whereby the strips are adapted to interlock with each other when pressed together.

The envelope is preferably provided with a depending flap means to cover said envelope closure means from contacting cladding material during passage of the material through the envelope opening when the receptacle is attached to the stripping means.

In accordance with another aspect of the present invention, there is provided a stripping apparatus for stipping fibrous cladding material from an elongate body, comprising:

a stripping means adapted to be detachably and sealingly secured at one end to the longitudinal portion of said body, the stripping means being formed of flexible material and having means whereby an operator can insert his hand and perform manipulations within the interior of the stripping means for work on said body whilst maintaining isolation between the interior of said stripping means and the operator's hands, and a stripping means opening at the other end through which stripped cladding material may pass for collection; and a detachable receptacle for collecting said cladding material stripped from the body comprising: a flexible envelope of substantially impermeable material having an opening to allow for the deposition of said cladding material therein; fastening means to integrally connect the receptacle to said stripping means opening enabling communication between the envelope and stripping apparatus interior via said openings; envelope closure means provided on said envelope and disposed apart from said fastening means to close the envelope opening and substantially seal the contents of the envelope during attachment or detachment to said apparatus independently of said fastening means; and an outer cover to enclose said envelope so as to facilitate containment of the envelope therein when sealed.

Preferably, the stripping means is provided with stripping closure means disposed apart from said fastening means to close the stripping means opening and substantially seal the same during attachment or detachment of said receptacle.

The closure means preferably comprises stripping closure strips attached to opposing inner faces of said stripping means, whereby the strips are adapted to interlock with each other when pressed togther.

The openings are preferably normally biased open by the provision of a stiffening stay means formed within a said opening.

The stripping apparatus is preferably provided with depending flap meanas to cover said closure means from contacting cladding material during passage of the same to the receptacle.

BRIEF DESCRIPTION OF THE DRAWINGS

This invention will be better understood in the light of the following description of one specific embodiment thereof. The description is made with reference to the accompanying drawings wherein:

FIG. 1 is a front perspective view showing the stripping apparatus attached to a pipe bearing fibrous cladding material;

FIG. 2 is a sectional end elevation taken along Section A—A of FIG. 1;

DETAILED DESCRIPTION OF THE PREFERRED EMBODIMENTS

Figure 3:
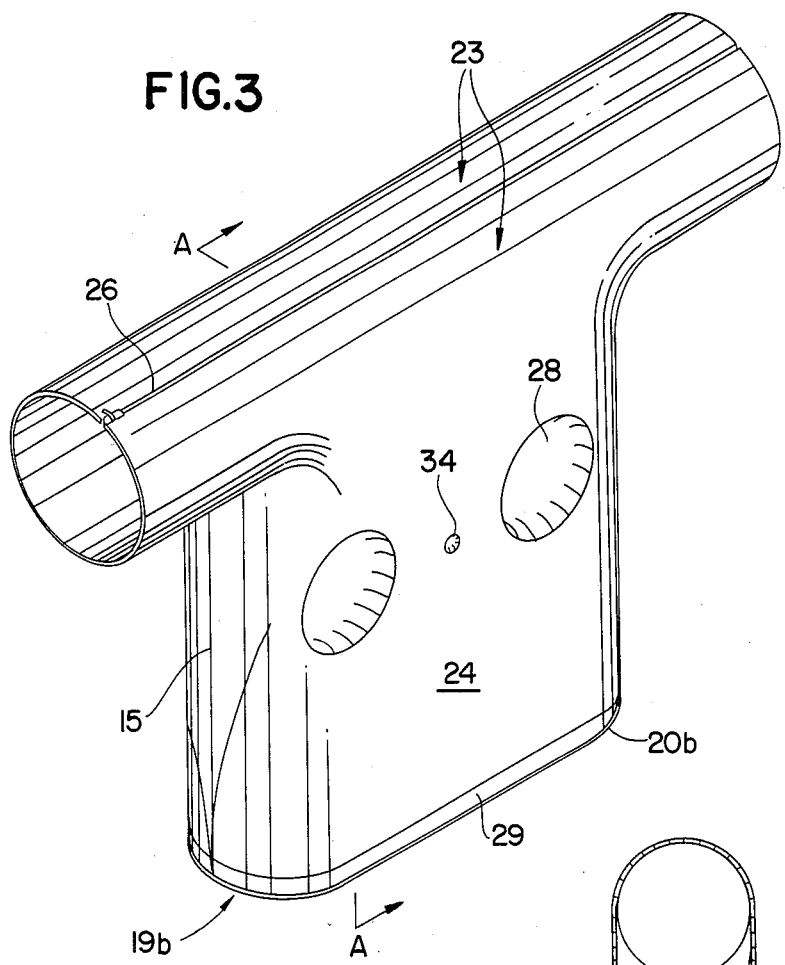
FIG. 3 is a front perspective view of the stripping means.
Figure 4:
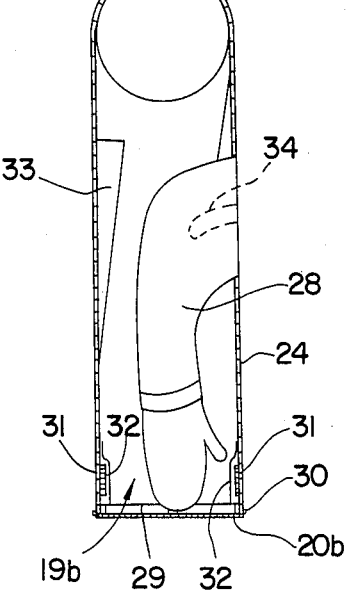
FIG. 4 is a sectional end elevation taken along Section A—A of FIG. 3.

The embodiment is directed towards a stripping apparatus which is specifically shaped for stripping fibrous cladding material in the form of lagging from a pipe.

A stripping apparatus 11 essentially comprises a stripping means 12 and a detachable receptacle 13.

The receptacle 13 is constructed from flexible, impermeable material, which is preferably a transparent, plastics material such as polythene, and has all seams fully welded. The receptacle is in the form of a bag and consists of an envelope 16 encompassed with an outer cover 17. The envelope is attached to the outer cover by means of a welded seam 18 disposed along the bottom of the receptacle only, thereby facilitating relative independent manipulation of the envelope with respect to the outer cover and vice versa.

The envelope 16 has an envelope opening 19a at its upper end which in turn is provided with a fastener 20a which forms part of a fastening means in the form of a sliding clasp fastener 20. The envelope is also provided with an envelope closure means which comprises a pair of envelope closure strips 21 attached to the opposing inner faces of the envelope and disposed apart from the fastener 20a. The closure strips are preferably co-operating parts of the type known under the trade mark "Velcro", which are adapted to interlock with each other when pressed together.

A pair of depending flap means 22 are provided on the inner face of the envelope immediately above the envelope closure strips 21 to cover and protect the same from cladding material which may impinge thereupon during passage through the envelope opening. The outer cover 17 is constructed to closely conform to the shape and size of the envelope therein. In addition, the sides of the receptacle may be gusseted to enable both the envelope and outer cover to be opened sufficiently for attachment to the stripping means 12 and to maximise the size of the envelope opening 19a for the passage of stripped cladding material therethrough.

The stripping means 12 is formed of flexible, impermeable material which is preferably a transparent plastics material such as heaby duty P.V.C. The top of the stripping means is provided with a pair of side flaps 23 located at opposite sides thereof which co-extend to form a pendent working portion 24. The flaps are shaped to form a sleeve portion at the top of the stripping means which approximately conforms to the size of the pipe 25 to which the stripping means is attached. Provided along the top terminating edge of each flap is a co-operating component of a sliding clasp fastener 26 which enables the stripping means to be detachably and sealingly secured to a portion of a pipe so that the flaps effectively wrap around the outer extremity of the pipe circumscribing the fibrous lagging material 27 therein one flap is longer than the other to enable the fastener to be displaced to one side of the pipe for ease of fastening.

The stripping means is also provided with a pair of quick release tightening straps 14 for sealingly fastening the stripping means opposite the arm portions 28 so that an operator may locate various tools therein to facilitate the stripping operation. Located above the pouch and formed integrally with the stripping means, is a nozzle 34 to which a hose may be attched and fluid, preferably water, injected into the interior of the shroud and receptacle to facilitate cleaning the inside thereof from extraneous cladding material. Like with the receptacle, the stripping means is provided with gussets 15 along the sides of the working portion 24, to allow widening of the same, thereby facilitating the stripping operation.

Now describing the method of using the stripping apparatus, the detachable receptacle 13 is attached to the bottom of the stripping means 12 by conjoining the respective fasteners 20a, 20b and operating the clasp fastener to connect the respective openings 19 of the receptacle and stripping means. The closure means are separated and covered with the respective depending flap means so that the stripping apparatus defines an internal chamber.

To sealingly close the interconnection between the bottom of the stripping means and the receptacle, the peripheral edge 35 of the outer cover 17 is disposed proximate the joined fasteners 20 and is attached to the outer side thereof by reinforcing tape to completely seal the joint.

The top flaps of the stripping means, which are separated, are then placed about the sides of the pipe and lagging, and closed thereabout by means of the sliding clasp fastener 26 to form the circumscribing sleeve portion about the pipe. The quick release tightening straps 14 are then tightened about the lateral arms 23 to sealingly so formed sleeve portion about the pipe.

The pendent working portion 24 forms a working station for an operator to strip lagging from the pipe by having a pair of arm portions 28 with gloves at the ends thereof extending inwardly towards the interior of the shroud through which an operator can insert his hands and perform manipulations therein for work on the pipe whilst maintaining isolation between the interior of the stripping means and the operator's hands.

The bottom of the stripping means forms a stripping means opening 19b which is provided with a fastener 20b which forms the other part of the fastening means in the form of the clasp sliding fastener 20. The bottom of the stripping means defining the opening 19b is hemmed to define a pocket 29 in which is inserted a stiffening stay means 30, which consists of a flexible nylon oval hoop, to bias the stripping means opening 19b towards the open position.

Disposed apart from the stripping means fastener 20b is a stripping closure means which consists of a pair of stripping means closure strips 31 attached to the respective opposing inner faces of the stripping means. As with the receptacle closure strips 21, the stripping means closure strips 31 are the co-operating parts of the type known under the trade mark "Velcro" and are adapted to interlock with each other when pressing together, thereby sealing the interior of the stripping means. Similarly, a pair of depending flap means 32 are attached to the inner faces of the stripping means above the respective stripping means closure strips to cover and protect the same from cladding material which may contact and impinge thereupon, during passage of the stripped material into the receptacle.

A pouch 33 is attached to the inner surface of the stripping means opposite the arm portions 28 so that an operator may locate various tools therein to facilitate the stripping operation. Located above the pouch and formed integrally with the stripping means, is a nozzle 34 to which a hose may be attached and fluid, preferably water, injected into the interior of the stripping means and receptacle to facilitate cleaning the inside thereof from extraneous cladding material. Like with the receptacle, the stripping means, is provided with gussets 15 along the sides of the working portion 24, to allow widening of the same, thereby facilitating the stripping operation.

Now describing the method of using the stripping apparatus, the detachable receptacle 13 is attached to the bottom of the stripping means 12 by conjoining the respective fasteners 20a, 20b and operating the clasp fastener to connect the respective openings 19 of the receptacle and stripping means. The closure means are separated and covered with the respective depending flap means 32 so that the stripping apparatus defines an internal chamber.

To sealingly close the interconnection between the bottom of the stripping means and the receptacle, the peripheral edge 35 of the outer cover 17 is disposed proximate the joined fasteners 20 and is attached to the outer side thereof by reinforcing tape 110 to completely seal the joint.

The top flaps of the stripping means, which are separated, are then placed about the sides of the pipe and lagging, and closed thereabout by means of the sliding clasp fastener 26 to form the circumscribing sleeve portion about the pipe. The quick release tightening straps 14 are then tightened about the lateral arms 23 to sealingly engage the sleeve portion of the stripping means to the pipe. At this point the operator may insert his hands within the arm portions 28 into the gloves and commence stripping the lagging from the pipe. Stripped lagging material may then fall within the stripping apparatus and be deposited within the envelope of the detachable receptacle.

To remove the detachable receptacle 13 from the stripping means 12 the operator can firstly wash the interior of the stripping means and receptacle by attaching a hose to the nozzle 34 and wetting down extraneous fibrous material therein. Subsequently, the depending flaps in the receptacle can then be lifted and the co-operating envelope closure strips pressed together, sealing the contents of the envelope from the stripping means. This operation can then be repeated with the stripping means closure strips sealing the contents of the stripping means from the region surrounding the interconnected fasteners. The reinforcing tape can then be removed from the joint interconnnecting the receptacle to the stripping means, and the clasp fastener 20 released, detaching the receptacle from the stripping means. Subsequently, the sealed envelope may be folded within the outer cover 17 and tie wire applied about the peripheral edge of the outer cover enclosing the sealed envelope therein.

At this point a used receptacle may be disposed of and a new receptacle attached to the stripping means by reapplying the clasp fastener 20 and reinforcing the joint by locating the peripheral edge of the outer cover proximate the joint and sealing with reinforcing tape. The respective closure stirps may then be separated and covered by the depending flaps allowing the operator to continue with the stripping operation.

In this manner, the same stripping means may be used repeatedly on a section of pipe without necessitating replacement thereof thus a number of disposable detachable receptacles can be used with the same stripping means, improving the efficiency and minimizing costs in completing a stripping operation.

It should be appreciated that the scope of the present invention is not limited to the scope of the specific embodiment herein described. Particularly, the invention is not limited to stripping lagging from pipes, but it may be embodied in different configurations so that it can be used to strip fibrous cladding material from other types of bodies bearing the same.

The claims defining the invention are as follows:

1. A detachable receptacle for attachment to a protective stripping means used for stripping fibrous cladding material from an elongate body, said stripping means having a body closure for a portion of said elongate body, said stripping means defining an interior space about said body with an open bottom and means for securing to said body, said receptacle being adapted to collect said stripped material, said receptacle comprising: a flexible envelope of substantially impermeable material defining an interior space having an opening at the top, to allow for the deposition of said cladding material therein, and a sealed bottom; an outer cover enclosing said envelope except for said opening, said outer cover attached to said envelope only at the bottom of said envelope and at a bottom region of said cover for independent manipulation of said envelope with repsect to said cover; fastening means to integrally connect said envelope to the bottom opening provided on said stripping means enabling communication between the stripping means and envelope interiors via respective bottom and top openings; envelope closure means provided on an inner top region of said envelope and disposed proximately below said fastening means for closing the envelope opening, isolating said fastening means, and substantially sealing the contents of the envelope during attachment or detachment to said stripping means independently of said fastening means; and means for releasably and sealingly attaching said cover to said stripping means along exteriors thereof.

2. A detachable receptacle as claimed at claim 1, wherein the means for releasably and sealingly attaching is disposed at an exterior peripheral edge of said outer cover and is releasably and sealingly attached to the lower exterior outerside of said stripping means and encompasses said envelope during connnection to said stripping means.

3. A detachable receptacle as claimed at claim 1 wherein the envelope closure means comprises envelope closure strips attached to opposing inner faces of the envelope adjacent said envelope opening but spaced from said fastening means whereby the strips are adapted to interlock with each other when pressed together.

4. A detachable receptacle as claimed at claim 1, wherein the envelope is provided with depending flap means to cover said envelope closure means from contacting cladding material during passage of the material through the envelope opening when the receptacle is attached to the stripping means.

5. A detachable receptacle as claimed at claim 1, wherein said fastening means comprises a clasp fastener part of which is disposed along the envelope opening and the other part of which is to be disposed along the correpsonding stripping apparatus opening.

6. A detachable receptacle as claimed at claim 1, wherein said outer cover is fixedly attached to said envelope near the end thereof opposite said envelope opening.

7. A stripping apparatus for stripping fibrous cladding material from an elongate body, comprising:
a stripping means adapted to be detachably and sealingly secured at one end to the longitudinal portion of said body, the stripping means being formed of flexible material having an interior space and an open bottom and having operator means whereby an operator can insert his hand and perform manipulations within the interior space of the stripping means for work on said body whilst maintaining isolation between the interior of said stripping means and the operator's hands, and the stripping means bottom opening at the other end from said body through which stripped cladding material may pass for collection; and
a detachable receptacle for collecting said cladding material stripped from the body comprising: a flexible envelope of substantially impermeable material defining an interior space having an opening at the top to allow for the deposition of said cladding material therein and a sealed bottom; and outer cover enclosing said envelope except for said opening, said outer cover attached to said envelope only at the bottom of said envelope and at a bottom region of said cover for independent manipulation of said envelope with respect to said cover; fastening means to integrally connect the envelope to said bottom opening stripping means enabling communication between the stripping means and envelope interiors via respective bottom and top openings; envelope closure means provided on an inner top region of said envelope and disposed proximately below said fastening means for closing the envelope opening, isolating said fastening means, and substantially sealing the contents of the envelope during attachment or detachment to said stripping means independently of said fastening means; and means for releasably and sealingly attaching said cover to said stripping means along exteriors thereof.

8. A stripping apparatus as claimed at claim 7 wherein the stripping means is provided with stripping closure means on the interior thereof and proximate to but apart from said fastening means for closing the stripping means bottom opening and substantially sealing the same during attachment or detachment of said receptacle.

9. A stripping apparatus as claimed at claim 8 wherein the stripping closure means comprises stripping means closure strips attached to opposing inner faces of said stripping means but spaced from said fastening means, whereby the strips are adapted to interlock with each other when pressed together.

10. A stripping apparatus as claimed at claim 7, wherein the means for releasably and sealingly attaching is disposed at an exterior peripheral edge of said outer cover and is capable of releasably and sealingly attaching to the exterior outerside of said stripping means so as to encompass said envelope during connection to said stripping means.

11. A stripping apparatus as claimed at claim 7 wherein the envelope closure means comprises envelope closure strips attached to opposing inner faces of the envelope adjacent said envelope opening but spaced from said fastening means whereby the strips are adapted to interlock with each other when pressed together.

12. A stripping apparatus as claimed at claim 7, wherein the openings are normally biased open by the provision of a stiffening stay means formed within a said opening.

13. A stripping apparatus as claimed at claim 7 wherein the stripping means is provided with depending flap means to cover said closure means from contacting cladding material during passage of the material to the receptacle.

14. A stripping apparatus as claimed at claim 7, wherein said fastening means comprises a clasp fastener one part of which is disposed along the envelope opening and the other part of which is to be disposed along the corresponding stripping apparatus opening.

15. A stripping apparatus as claimed at claim 7, wherein said outer cover is fixedly attached to said envelope near the end thereof opposite said envelope opening.

* * * * *

UNITED STATES PATENT AND TRADEMARK OFFICE
CERTIFICATE OF CORRECTION

PATENT NO. : 4,746,175

DATED : May 24, 1988

INVENTOR(S) : William J. Hamlet, et al

It is certified that error appears in the above-identified patent and that said Letters Patent is hereby corrected as shown below:

The title page should be deleted to appear as per attached title page.

Figure 5:
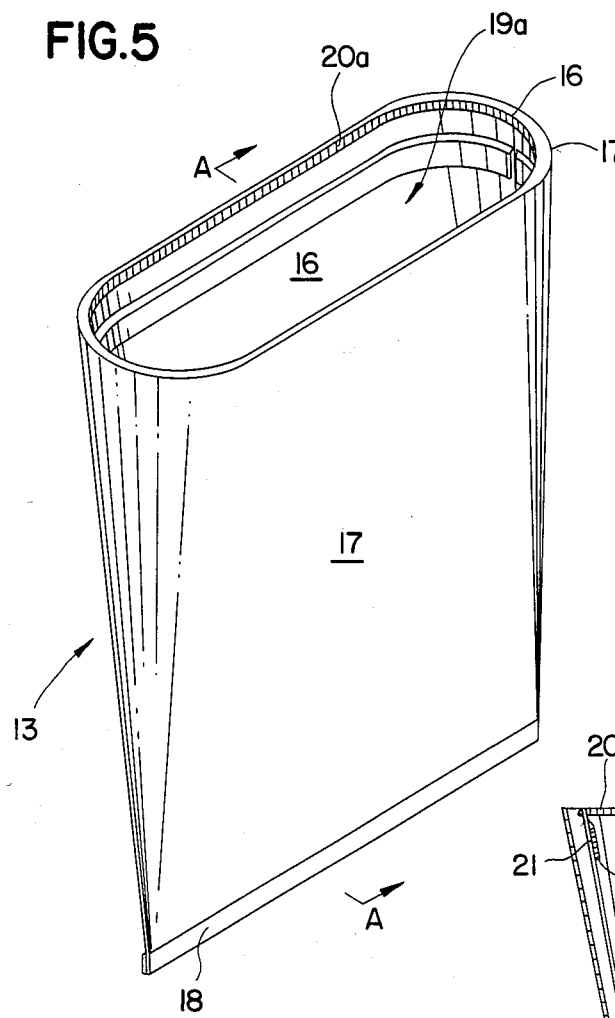
FIG. 5 is a front perspective view of the detachable receptacle.
Figure 6:
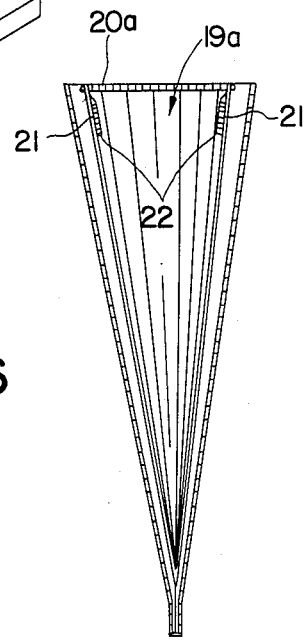
FIG. 6 is a sectional end elevation taken along Section A—A of FIG. 5.

Figures 2 and 5 should be deleted to be replaced with figures 2 and 5 as shown on the attached sheet.

Signed and Sealed this

Second Day of May, 1989

Attest:

DONALD J. QUIGG

Attesting Officer

Commissioner of Patents and Trademarks

United States Patent [19]

Hamlet et al.

[11] Patent Number: 4,746,175
[45] Date of Patent: May 24, 1988

[54] DETACHABLE RECEPTACLE AND STRIPPING APPARATUS FOR STRIPPING LAGGING

[76] Inventors: William J. Hamlet, 17 Gleneagles Way, East Hamersley; Gordon S. Hatch, 6 College Road, Gooseberry Hill, both of Australia

[21] Appl. No.: 945,658
[22] PCT Filed: Mar. 13, 1986
[86] PCT No.: PCT/AU86/00065
§ 371 Date: Dec. 22, 1986
§ 102(e) Date: Dec. 22, 1986
[87] PCT Pub. No.: WO86/05431
PCT Pub. Date: Sep. 25, 1986

[30] Foreign Application Priority Data

Mar. 13, 1985 [AU] Australia ............... PG9702

[51] Int. Cl.⁴ .................................. B65D 30/2
[52] U.S. Cl. .................................. 312/1; 312/3
[58] Field of Search .................... 312/1, 3; 383/37, 111

[56] References Cited

U.S. PATENT DOCUMENTS

| | | | |
|---|---|---|---|
| 3,726,329 | 4/1973 | Dean | 383/37 X |
| 3,986,630 | 10/1976 | Catlin | 220/86 |
| 4,185,673 | 1/1980 | Daniello | 383/111 X |
| 4,626,291 | 12/1986 | Natale | 312/3 X |

FOREIGN PATENT DOCUMENTS

| | | |
|---|---|---|
| 159176 | 11/1951 | Australia . |
| 551056 | 3/1983 | Australia . |
| 4338885 | 12/1985 | Australia . |
| 1275683 | 4/1986 | Australia . |
| 1188191 | 6/1985 | Canada . |
| 0130747 | 9/1985 | European Pat. Off. . |
| 8304610 | 8/1983 | Sweden . |
| 1567270 | 5/1980 | United Kingdom ............... 312/1 |
| 2131679 | 6/1984 | United Kingdom . |
| 2157822 | 4/1985 | United Kingdom . |

Primary Examiner—Joseph Falk
Attorney, Agent, or Firm—Steele, Gould & Fried

[57] ABSTRACT

A detachable bag (13) and shroud (12) which combine to form a stripping apparatus (11) for stripping and collecting fibrous cladding material (27) from a pipe (25). The shroud (12) is adapted to be detachably and sealingly secured to the pipe (25) and the bag (13) is likewise secured to the shroud (12). The bag (13) includes a fastening means (20) to attach an inner envelope (16) thereof to the bottom opening (19b) of the shroud and an outer cover (17) which can be sealingly attached to the outerside of the shroud (12) enclosing the envelope (16) and fastening means (20). The envelope (16) and shroud (12) are each provided with "Velcro" closure strips (21) along their respective inner faces adjacent the fastening means (20) to enable the envelope (16) and shroud (12) to be sealingly closed independently of the other either side of the fastening means (20) to prevent external exposure to the contents of either during attachment and detachment of the bag from the shroud.

15 Claims, 3 Drawing Sheets

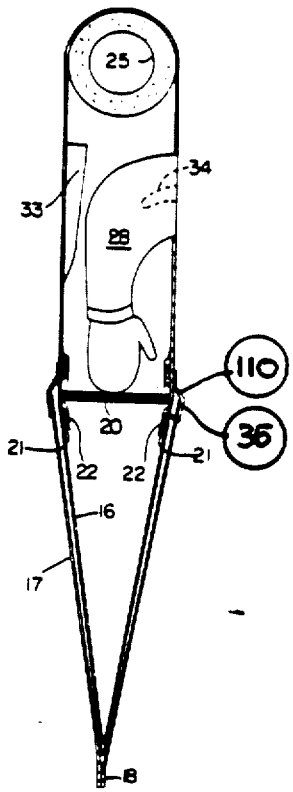

UNITED STATES PATENT AND TRADEMARK OFFICE
CERTIFICATE OF CORRECTION

PATENT NO. : 4,746,175

DATED : May 24, 1988

INVENTOR(S) : Hamlet et al

It is certified that error appears in the above-identified patent and that said Letters Patent is hereby corrected as shown below:

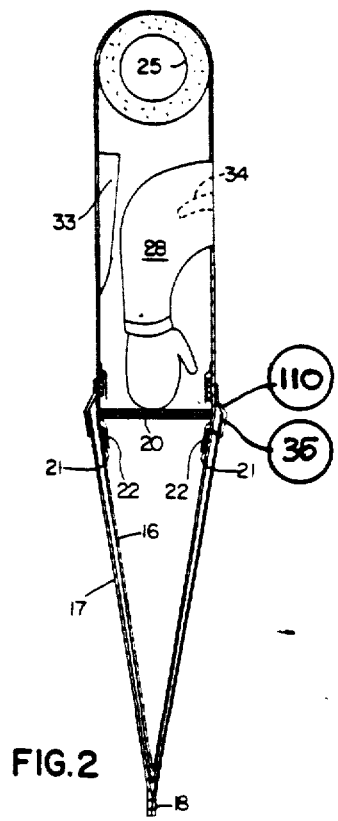

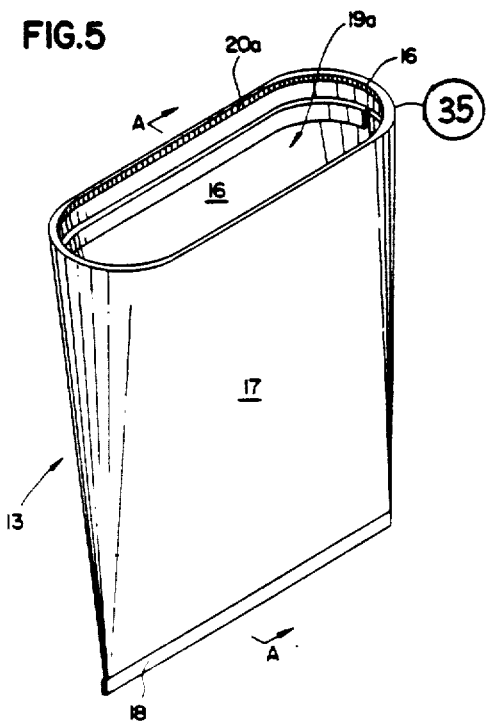

Add --circled reference numerals--